(12) United States Patent
Dishongh

(10) Patent No.: US 7,663,490 B2
(45) Date of Patent: Feb. 16, 2010

(54) METHODS AND APPARATUS FOR EFFICIENTLY TRACKING ACTIVITY USING RADIO FREQUENCY IDENTIFICATION

(75) Inventor: Terrance J. Dishongh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 258 days.

(21) Appl. No.: 11/864,891

(22) Filed: Sep. 28, 2007

(65) Prior Publication Data

US 2009/0085721 A1 Apr. 2, 2009

(51) Int. Cl.
*G08B 1/08* (2006.01)

(52) U.S. Cl. .................. 340/572.1; 340/539.11; 340/572.4; 340/573.1; 340/10.1; 340/10.33; 340/10.34; 455/127.5; 455/571; 455/572

(58) Field of Classification Search .......... 340/572.1, 340/539.11, 539.13, 572.4, 825.49, 573.1, 340/573.4, 5.1, 5.2, 5.61, 10.1, 10.33, 10.34; 235/385, 386; 455/561, 571, 572, 127.5
See application file for complete search history.

(56) References Cited

U.S. PATENT DOCUMENTS

| | | | | |
|---|---|---|---|---|
| 5,917,425 A | * | 6/1999 | Crimmins et al. | 340/825.49 |
| 6,894,612 B2 | * | 5/2005 | Xydis | 340/539.11 |
| 6,970,097 B2 | * | 11/2005 | Welles et al. | 340/825.49 |
| 7,079,034 B2 | * | 7/2006 | Stilp | 340/573.1 |
| 7,091,827 B2 | * | 8/2006 | Stilp | 340/10.1 |
| 7,403,120 B2 | * | 7/2008 | Duron et al. | 340/572.1 |
| 7,538,666 B2 | * | 5/2009 | Campman | 340/539.13 |
| 7,589,614 B2 | * | 9/2009 | Xydis | 340/5.61 |

* cited by examiner

*Primary Examiner*—Davetta W Goins
(74) *Attorney, Agent, or Firm*—Derek J. Reynolds

(57) ABSTRACT

A wearable data processing system includes a high power radio module and a low power radio module. The high power radio module may retrieve data from radio frequency identifier (RFID) tags. The low power radio module may transmit data to a base station data pertaining to the detected RFID tags. The low power radio module may also receive a power management signal from a gate radio. The gate radio may have an adjustable range. A power management engine in the wearable data processing system may determine whether the low power radio module is receiving the power management signal from the gate radio. The power management engine may also activate and deactivate the high power radio module, depending on whether the low power radio module is receiving the power management signal from the gate radio. Other embodiments are described and claimed.

10 Claims, 3 Drawing Sheets

METHODS AND APPARATUS FOR EFFICIENTLY TRACKING ACTIVITY USING RADIO FREQUENCY IDENTIFICATION

FIELD OF THE INVENTION

The present disclosure relates generally to the field of data processing, and more particularly to methods and related apparatus for efficiently tracking activity using radio frequency identification (RFID).

BACKGROUND

Research is currently underway to develop more effective and efficient ways to use RFID tags and RFID readers to track human activity. For instance, a caregiver may want to know what kind of activities an elderly person or some other subject has engaged in during a certain time period. For example, the caregiver may want to know whether the subject has risen from bed, taken a beverage out of a refrigerator, taken medications, etc. This kind of activity tracking may be automated by giving the subject an RFID reader to wear, and providing various objects (e.g., the door to the bedroom, the beverage container, the medicine container, etc.) with distinct RFID tags.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

Figure 1:
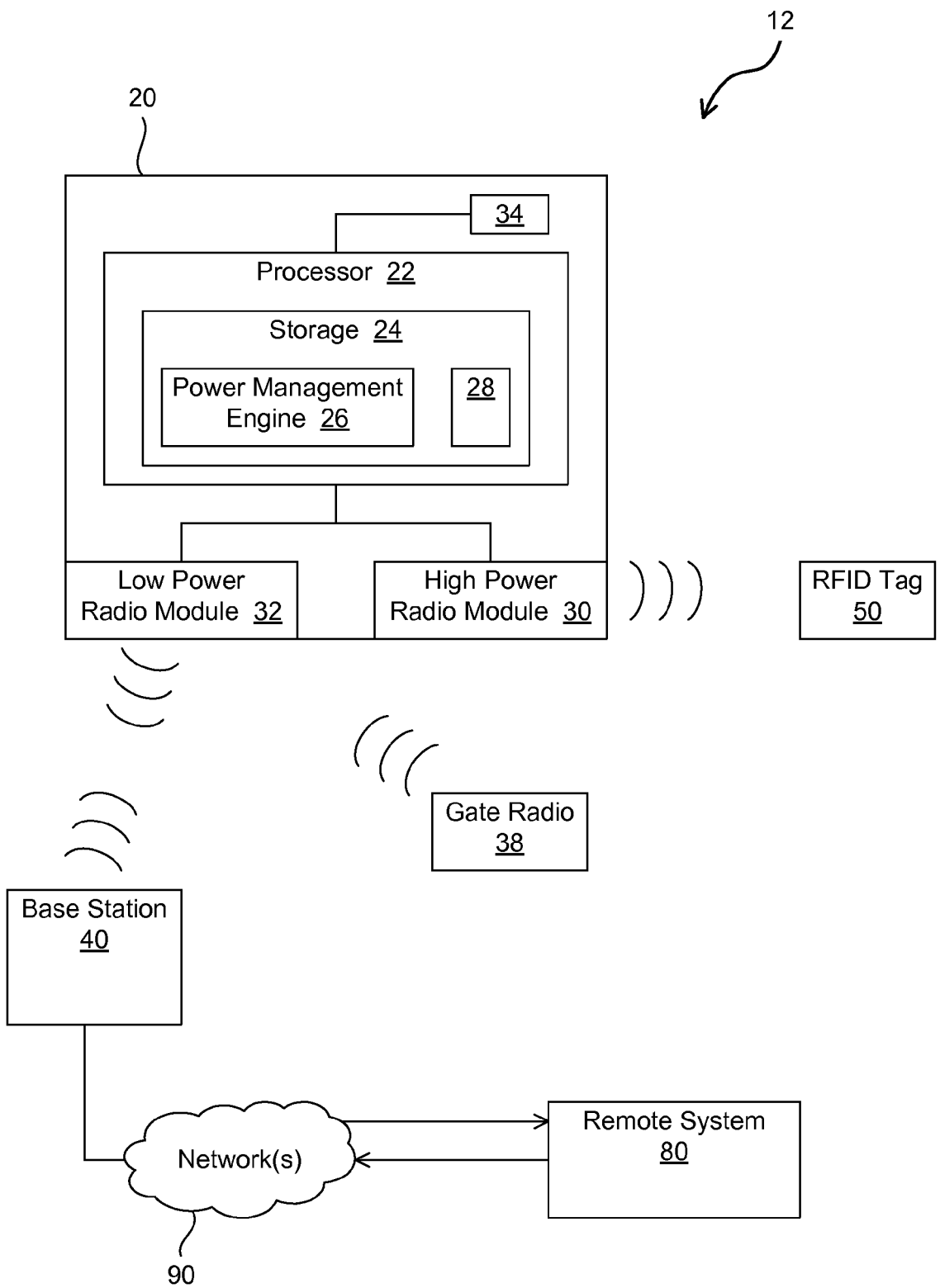
FIG. 1 is a block diagram depicting a suitable data processing environment in which certain aspects of an example embodiment of the present invention may be implemented.

A number of methods exist to collect data about the activities of daily living carried out by elderly citizens. A promising technology involves RFID tags on items within the living environment, along with a bracelet with embedded radios and processors to be worn by the subject. For example, RFID tags may be attached to items in the home such as the kettle, toaster, stove, shower, medicine cabinet, doors, windows, etc.

One embodiment of a bracelet for reading such tags is referred to as the iBracelet. This bracelet, which was developed through collaboration between Intel Corporation and the University of Washington, contains a battery, an embedded processor, an RFID transceiver, and a short-range data communications radio using an Institute of Electrical and Electronics Engineers (IEEE) 802.15.4 protocol. The 2006 version of the 802.15.4 protocol specification may currently be obtained from http://www.zigbee.org/en/index.asp.

The subject wears the bracelet on his or her wrist, and when the subject touches or comes very close to an object with an RFID tag, the RFID reader in the iBracelet can detect the tag. In response, the iBracelet sends information from the tag to a data processing system, such as a personal computer (PC), that serves as a base station. The information may indicate that the subject has touched or come very close to touching a certain object (e.g., door, a medicine container, etc). Based on the information received from the iBracelet and predetermined profiles of known tasks, the base station may infer that the subject has performed a certain activity (e.g., opened the door, taken the medicine). The base station may then forward information about the subject's activities to remote caregivers, such as family members and health care professionals.

In order to ensure that all activities are detected, the RFID reader is constantly active. The high energy cost of the RFID transmitting continuously can lead to short battery life.

For purposes of this disclosure, the term "radio apparel" is used to refer to a device that is designed to be worn by a human subject while reading RFID tags on objects in the subject's environment to track activities of the subject.

This disclosure describes methods and apparatus for extending the battery life of radio apparel, thereby extending the amount of time the radio apparel can remain active without requiring recharge or replacement of the battery. In particular, the present disclosure pertains to limiting the geographical area in which the radio apparel is fully active. For example, the radio apparel may be kept at full power in areas where activity tracking is most needed, and the radio apparel may be shifted to a reduced power state as soon as the subject moves to a different area.

For instance, to track activity of a subject in the subject's dwelling, selected rooms in the dwelling, or all rooms in the dwelling, may be equipped with wall-powered transceivers referred to herein as gate radios or simply gates. These gates may transmit at all times. In addition, the range of each gate may be limited to a location that is considered relevant or important for activity tracking. For instance, gates may be installed only in the kitchen and the bathroom, if those rooms are the only rooms where activity is to be tracked. The signals transmitted by the gates may be referred to as power management signals.

In one embodiment, the gates have the same kind of transceiver that is used to connect the radio apparel to the base station. Also, each gate may include an adjustment mechanism for varying the strength of the power management signal, to control the range of initiation associated with that gate.

When the short-range radio transceiver in the radio apparel detects gate signals, it enables the RFID reader in the radio apparel. When no gate signal is detected, the RFID reader is inactivated, for instance by placing RFID reader in a low-power standby mode. Thus, the RFID reader (the major power drain in the system) is active only in high-relevance areas. Consequently, the wearable apparel may consume only minimal power when the user is in areas that are not important for tracking, such as outside of the dwelling.

The wearable apparel may use low-power reception of BlueTooth, 802.15.4, or similar protocol stacks for control signaling, while limiting RFID broadcasting to geographical areas of maximum relevance. The transceiver for communicating with the base station and the gates may be referred to as the low power radio module, while the transceiver for reading RFID tags may be referred to as the high power radio module. For instance, a typical multi-protocol RFID reader may draw 40 milliamps (mA) continuously, while a short range 2.4 gigahertz (GHz) radio receiver may only draw 5-6 mA.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, wearable devices, and other devices for processing or transmitting information.

FIG. 1 is a block diagram depicting a suitable data processing environment 12 in which certain aspects of an example embodiment of the present invention may be implemented. Data processing environment 12 includes a wearable processing system 20, a gate radio 38, an RFID tag 50, a base station 40, and a remote processing system 80. Wearable processing system 20 may also be referred to as radio apparel 20.

Base station 40 may be implemented using any suitable processing system. For instance, base station 40 may include a processor communicatively coupled to one or more volatile or nonvolatile data storage devices (e.g., RAM, ROM, mass storage devices). For purposes of this disclosure, the term "ROM" may be used in general to refer to nonvolatile memory devices such as erasable programmable ROM (EPROM), electrically erasable programmable ROM (EEPROM), flash ROM, flash memory, etc. Base station 40 may also include one or more network interface controllers (NICs), video controllers, integrated drive electronics (IDE) controllers, small computer system interface (SCSI) controllers, universal serial bus (USB) controllers, input/output (I/O) ports, input devices, output devices such as a display, etc.

Base station 40 may be controlled, at least in part, by input from conventional input devices, such as a keyboard, a mouse, etc., and/or by directives received from another machine, biometric feedback, or other input sources or signals, such as radio apparel 20. Base station 40 may utilize one or more connections to one or more remote data processing systems 80, such as through a NIC, a modem, or other communication ports or couplings and a physical and/or logical network 90, such as a local area network (LAN), a wide area network (WAN), an intranet, the Internet, etc. Communications involving the network may utilize various wired and/or wireless short range or long range carriers and protocols, including radio frequency (RF), satellite, microwave, IEEE 802.11, 802.15.4, 802.16, 802.20, Bluetooth, optical, infrared, cable, laser, etc. Protocols for 802.11 may also be referred to as wireless fidelity (WiFi) protocols. Protocols for 802.16 may also be referred to as worldwide interoperability for microwave access (WiMAX) or wireless metropolitan area network (WirelessMAN) protocols, and information concerning those protocols is currently available at grouper.ieee.org/groups/802/16/index.html.

Radio apparel 20 includes at least one processor 22, communicatively coupled to a low power radio module 32 for communicating with base stations and gate radios, and to a high power radio module 30 for reading RFID tags. Radio apparel 20 includes control logic for reading data from RFID tags and for transmitting that data to a base station. In one embodiment, low power radio module 32 operates substantially all of the time and consumes approximately 5.5 mA. By contrast, high power radio module 30 consumes approximately 40 mA, when active. The control logic for reading data from RFID tags and forwarding that data (or information associated with that data) to a base station may be referred to as a data engine 28.

Radio apparel 20 also includes control logic for deactivating high power radio module 30, depending on whether or not low power radio module 32 is receiving a power management signal from a gate radio. This control logic for deactivating high power radio module 30 may be referred to as a power management engine 26. In the example embodiment, power management engine 26 is implemented as software or firmware that is stored in radio apparel 20 and executed by processor 22. In other embodiments, some or all of the control logic for managing the power used by high power radio module 30 may be implemented in hardware. Also, in the example embodiment, power management engine 26 resides in ROM or other storage 24 in processor 22, but some or all of the storage used by power management engine 26 may be situated outside of processor 22 in alternative embodiments. The components of radio apparel 20 are powered by a battery 34.

Figure 2:
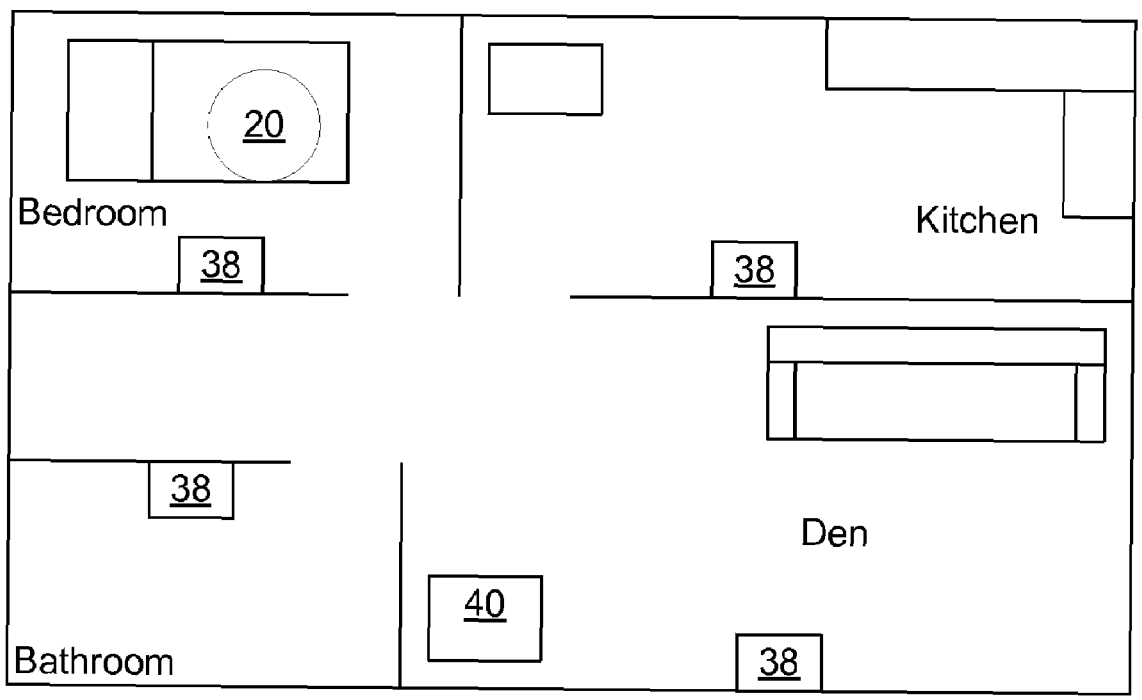
FIG. 2 is a block diagram depicting an example living environment involving components from FIG. 1.

FIG. 2 is a block diagram depicting an example living environment involving components from FIG. 1. The living environment of FIG. 2 includes a bedroom, a kitchen, a bathroom, and a den. In the example embodiment, activity of the subject is to be tracked in each of these rooms. Accordingly, each room is equipped with a gate radio 38, which may be powered from a wall outlet or may be hardwired into the building's electrical supply. In addition, each gate radio will have been adjusted to cover a desired geographical area. For instance, the gate in the bathroom may be set to a relative low transmit power, since the bathroom is relatively small, while the gate in the den may have been set to a relatively high transmit power, since the den is much larger than the bathroom.

The living environment also includes a base station 40 for receiving information from radio apparel 20 and sharing information with remote systems.

Figure 3:
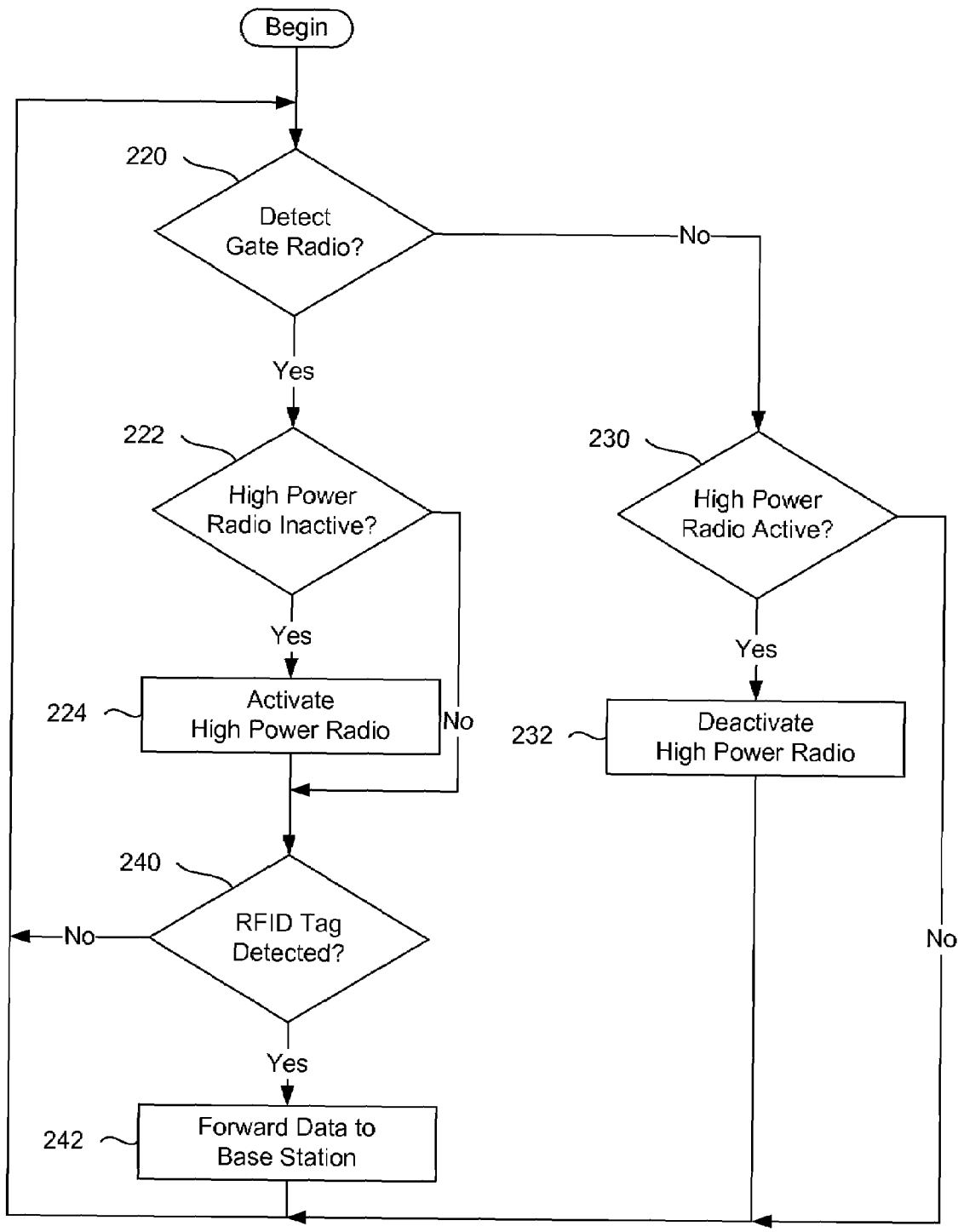
FIG. 3 is a flowchart of an example embodiment of a process for efficiently tracking activity.

FIG. 3 is a flowchart of an example embodiment of a process for efficiently tracking activity in the environment of FIG. 2. That process begins at block 220 with power management engine 26 in radio apparel 20 determining whether or not low power radio module 32 is receiving a power management signal from a gate radio. If a power management signal is being received, radio apparel 20 may determine whether high power radio module 30 is inactive, as shown at block 222. If low power radio module 32 is receiving a power management signal but high power radio module 30 is inactive, power management engine 26 may activate high power radio module 30, as indicated at block 224.

Radio apparel 20 may then determine whether an RFID tag has been detected, as shown at block 240. If an RFID tag is detected, radio apparel 20 may forward data from the detected tag to base station 40, as shown at block 242. The process may then return to block 220, with power management engine 26 checking again whether a power management signal is being received. If no power management signal is being received, power management engine 26 may then determine whether high power radio module 30 is active, as depicted at block 230. If high power radio module 30 is active but no power management signal is being received, power management engine 26 may deactivate high power radio module 30, as shown at block 232. The process may then return to block 220, to be repeated indefinitely.

Since the high power radio module consumes more than twice as much power as the low power radio module wherein both modules are active, significant power savings may be realized by deactivating the high power radio module when the radio apparel is not within range of a gate radio. In the example embodiment, deactivating the high power radio module 30 reduces the power consumption of the radio apparel by more than fifty percent.

If the subject were to leave the residence to take a walk in the park, the power management engine may keep the high power radio module in an inactive or low power state the entire time the subject (and thus the radio apparel) is away from the residence. Similarly, if activity were not to be monitored within the bedroom, the gate radio from the bedroom could be removed, and the power management engine could keep the high power radio module inactive while the subject sleeps.

In light of the principles and example embodiments described and illustrated herein, it will be recognized that the illustrated embodiments can be modified in arrangement and detail without departing from such principles. Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; and other detectable arrangements of particles manufactured or formed by a machine or device. Instructions may also be used in a distributed environment, and may be stored locally and/or remotely for access by single or multi-processor machines.

It should also be understood that the hardware and software components depicted herein represent functional elements that are reasonably self-contained so that each can be designed, constructed, or updated substantially independently of the others. The control logic for providing the functionality described and illustrated herein may be implemented as hardware, software, or combinations of hardware and software in different embodiments.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A system for efficiently monitoring human activity, the system comprising:
    a gate radio to transmit a power management signal, the gate radio to draw power from electrical wiring in a building;
    an adjustment mechanism in the gate radio to allow the power management signal to be adjusted to a selected range;
    a wearable, battery-powered data processing system;
    a high power radio module in the wearable, battery-powered data processing system, high power radio module capable of wirelessly retrieving data from an external radio frequency identifier (RFID) tag;
    a low power radio module in the wearable, battery-powered data processing system, the low power radio module capable of wirelessly communicating with a base station concerning the data retrieved from the external RFID tag, wherein the low power radio module is also capable of wirelessly receiving the power management signal transmitted by the gate radio when the wearable, battery-powered data processing system is within the selected range of the gate radio; and
    a power management engine in the wearable, battery-powered data processing system, the power management engine to perform operations comprising:
        determining whether the low power radio module is receiving the power management signal from the gate radio;
        deactivating the high power radio module in response to a determination that the low power radio module is not receiving the power management signal from the gate radio; and
        activating the high power radio module in response to a determination that the low power radio module is receiving the power management signal from the gate radio.

2. A system according to claim 1, wherein the power management engine reduces power consumption of the wearable, battery-powered data processing system by at least fifty percent in response to determining that the low power radio module is not receiving the power management signal from the external gate radio.

3. A system according to claim 1, wherein:
    when the high power radio module is active, the high power radio module draws more than twice as much power as the low power radio module.

4. A system according to claim 1, wherein:
    the high power radio module draws more than twenty milliamps when active; and
    the low power radio module draws less than ten milliamps when active.

5. A system according to claim 1, further comprising:
    after determining that the low power radio module is receiving the power management signal from the gate radio and activating the high power radio module, retrieving data from the external RFID tag, via the high power radio module; and
    forwarding information concerning the RFID tag to the base station.

6. A wearable data processing system comprising:
    a high power radio module in the wearable data processing system capable of retrieving data from a radio frequency identifier (RFID) tag;
    a low power radio module in the wearable data processing system capable of transmitting data associated with the RFID tag to a base station, wherein the low power radio module is also capable of receiving a power management signal from a gate radio; and
    a power management engine in the wearable data processing system, the power management engine to perform operations comprising:
        determining whether the low power radio module is receiving the power management signal from the gate radio;
        inactivating the high power radio module in response to a determination that the low power radio module is not receiving the power management signal from the gate radio; and
        activating the high power radio module in response to a determination that the low power radio module is receiving the power management signal from the gate radio.

7. A wearable data processing system according to claim 6, wherein the power management engine reduces power consumption of the wearable data processing system by at least fifty percent in response to determining that the low power radio module is not receiving the power management signal from the gate radio.

8. A wearable data processing system according to claim 6, wherein:
 when the high power radio module is active, the high power radio module draws more than twice as much power as the low power radio module.

9. A wearable data processing system according to claim 6, wherein:
 the high power radio module draws more than twenty milliamps when active; and
 the low power radio module draws less than ten milliamps when active.

10. A wearable data processing system according to claim 6, wherein the wearable data processing system comprises a wearable, battery-operated data processing system.

\* \* \* \* \*